US012643238B2

(12) United States Patent
Hashizaki et al.

(10) Patent No.:    US 12,643,238 B2
(45) Date of Patent:        Jun. 2, 2026

(54) SUBSTRATE CONVEYING ROBOT AND CONTROL METHOD FOR SUBSTRATE CONVEYING ROBOT

(71) Applicant: KAWASAKI JUKOGYO KABUSHIKI KAISHA, Kobe (JP)

(72) Inventors: Satoshi Hashizaki, Kobe (JP); Shinya Kitano, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 32 days.

(21) Appl. No.: 18/291,706

(22) PCT Filed: Aug. 17, 2022

(86) PCT No.: PCT/JP2022/031051
§ 371 (c)(1),
(2) Date: Jan. 24, 2024

(87) PCT Pub. No.: WO2023/026917
PCT Pub. Date: Mar. 2, 2023

(65) Prior Publication Data
US 2024/0253233 A1      Aug. 1, 2024

(30) Foreign Application Priority Data
Aug. 24, 2021     (JP) ................................ 2021-136257

(51) Int. Cl.
*B25J 9/16*          (2006.01)
*B25J 11/00*         (2006.01)
*B25J 19/02*         (2006.01)

(52) U.S. Cl.
CPC ............. *B25J 9/1697* (2013.01); *B25J 9/163* (2013.01); *B25J 9/1653* (2013.01); *B25J 9/1664* (2013.01); *B25J 11/0095* (2013.01); *B25J 19/021* (2013.01)

(58) Field of Classification Search
CPC ...... B25J 11/0095; B25J 13/08; B25J 19/021; B25J 9/163; B25J 9/1653; B25J 9/1664; B25J 9/1697; H01L 21/677
See application file for complete search history.

(56) References Cited

U.S. PATENT DOCUMENTS

| | | | |
|---|---|---|---|
| 5,906,469 A | 5/1999 | Oka et al. | |
| 8,892,242 B2 | 11/2014 | Kimura | |
| 10,417,757 B2 | 9/2019 | Kobayashi | |

(Continued)

FOREIGN PATENT DOCUMENTS

| | | |
|---|---|---|
| JP | H09-148404 A | 6/1997 |
| JP | 2004-200214 A | 7/2004 |

(Continued)

OTHER PUBLICATIONS

Mar. 10, 2026 Office Action issued in Japanese Patent Application No. 2025-091882.

*Primary Examiner* — Wade Miles
*Assistant Examiner* — Jerrod Irvin Davis
(74) *Attorney, Agent, or Firm* — Oliff PLC

(57)                ABSTRACT
A substrate conveying robot includes a controller configured or programmed to acquire a conveyance gap based on an image captured by an imager, and control at least one of carrying a substrate out of a storage or carrying the substrate into the storage based on a size of an acquired conveyance gap.

12 Claims, 6 Drawing Sheets

(56)     References Cited

U.S. PATENT DOCUMENTS

2013/0345836 A1* 12/2013 Ikushima ........... G05B 19/0426
                                                        700/86
2018/0323095 A1  11/2018 Peh et al.
2023/0321839 A1  10/2023 Shimizu et al.

FOREIGN PATENT DOCUMENTS

| | | | |
|---|---|---|---|
| JP | 2011-211048 | A | 10/2011 |
| JP | 5447431 | B2 | 3/2014 |
| JP | 6329397 | B2 | 5/2018 |
| JP | 6571475 | B2 | 9/2019 |
| JP | 2020-520098 | A | 7/2020 |
| JP | 2022-043556 | A | 3/2022 |
| KR | 10-0315007 | B1 | 2/2002 |
| KR | 10-2011-0089645 | A | 8/2011 |

* cited by examiner

SUBSTRATE CONVEYING ROBOT AND CONTROL METHOD FOR SUBSTRATE CONVEYING ROBOT

TECHNICAL FIELD

The present disclosure relates to a substrate conveying robot and a control method for a substrate conveying robot, and more particularly, it relates to a substrate conveying robot including a substrate holding hand that holds a substrate and a control method for a substrate conveying robot.

BACKGROUND ART

Conventionally, a substrate conveying robot including a substrate holding hand that holds a substrate is known. Such a substrate conveying robot is disclosed in Japanese Patent No. 6571475, for example.

Japanese Patent No. 6571475 discloses a substrate conveying robot that carries a substrate out of a cassette in which a plurality of substrates are stored. The substrate conveying robot uses a hand to carry the substrate out of the cassette based on teaching data taught in advance. Furthermore, Japanese Patent No. 6571475 discloses a camera that images the plurality of substrates stored in the cassette, and a controller that processes the images captured by the camera. The controller acquires the inclination angles, curved states, etc. of the plurality of substrates arranged in the cassette based on the images captured by the camera. The controller corrects the teaching data for carrying out the substrate based on the acquired inclination angles, curved states, etc. of the substrates. That is, based on the acquired inclination angles, curved states, etc. of the substrates, the movement path or position of the hand that enters the cassette is changed, for example. Thus, even when the substrates are arranged in an inclined state or are curved in the cassette, the substrate can be carried out of the cassette.

PRIOR ART

Patent Document

Patent Document 1: Japanese Patent No. 6571475

SUMMARY OF THE INVENTION

The plurality of substrates are arranged in a stacked manner at predetermined intervals in the cassette. Therefore, as in Japanese Patent No. 6571475, when the movement path or position of the hand that enters the cassette is changed based on the acquired inclination angles, curved states, etc. of the substrates, for example, the hand may interfere with a substrate that is arranged adjacent to the substrate to be carried out. Furthermore, the substrate being conveyed by the hand may interfere with the substrates arranged adjacent thereto. Therefore, the substrate disadvantageously interferes when the substrate is conveyed.

The present disclosure is intended to solve the above problems. The present disclosure aims to provide a substrate conveying robot and a control method for a substrate conveying robot each capable of reducing or preventing substrate interference when a substrate is conveyed.

A substrate conveying robot according to a first aspect of the present disclosure is operable to perform at least one of carrying a substrate out of a storage storing a plurality of substrates or carrying the substrate into the storage, and includes a robot arm, a substrate holding hand attached to a tip end of the robot arm to hold the substrate, an imager to image the plurality of substrates stored in the storage, and a controller configured or programmed to acquire, based on an image captured by the imager, a conveyance gap including at least one of a gap in the storage between a position of the substrate holding hand and the substrate, a gap in the storage between the substrate being conveyed by the substrate holding hand and a substrate adjacent to the substrate being conveyed by the substrate holding hand, or a gap between the substrates stored in the storage, and control operations of the robot arm and the substrate holding hand to perform at least one of carrying the substrate out of the storage or carrying the substrate into the storage based on a size of an acquired conveyance gap.

In the substrate conveying robot according to the first aspect of the present disclosure, as described above, the controller is configured or programmed to acquire, based on the image captured by the imager, the conveyance gap including at least one of the gap in the storage between the position of the substrate holding hand and the substrate, the gap in the storage between the substrate being conveyed by the substrate holding hand and the substrate adjacent to the substrate being conveyed by the substrate holding hand, or the gap between the substrates stored in the storage, and control the operations of the robot arm and the substrate holding hand to perform at least one of carrying the substrate out of the storage or carrying the substrate into the storage based on the size of the acquired conveyance gap. Accordingly, even when a movement path or position of the substrate holding hand that enters the storage is changed based on the inclination angles or curved states of the substrates, for example, a control can be performed such that the substrate is not carried out of the storage or is not carried into the storage when the size of the conveyance gap is insufficient. Therefore, interference of the substrate holding hand with the substrate arranged adjacent to the substrate to be carried out and interference of the substrate being conveyed by the substrate holding hand with the substrate arranged adjacent thereto can be reduced or prevented. Consequently, when the substrate is conveyed, substrate interference can be reduced or prevented.

Furthermore, it is possible to move an optical sensor along an arrangement direction of the substrates stored in the storage to detect the positions of the substrates and to acquire the conveyance gap. On the other hand, in this case, the optical sensor detects only portions of the substrates, such as one ends, and thus it is difficult to accurately acquire the conveyance gap at central portions and other ends of the substrates. Therefore, the conveyance gap is acquired based on the image captured by the imager, as described above, such that the conveyance gap not only at one ends of the substrates but also at the central portions and other ends of the substrates can be acquired. Consequently, when the substrate is conveyed, substrate interference can be appropriately reduced or prevented.

A control method for a substrate conveying robot operable to perform at least one of carrying a substrate out of a storage storing a plurality of substrates or carrying the substrate into the storage according to a second aspect of the present disclosure includes imaging the plurality of substrates stored in the storage using an imager, acquiring, based on an image captured by the imager, a conveyance gap including at least one of a gap in the storage between a position of a substrate holding hand of the substrate conveying robot and the substrate, a gap in the storage between the substrate being conveyed by the substrate holding hand and a substrate adjacent to the substrate being conveyed by the substrate holding hand, or a gap between the substrates stored in the storage, and controlling operations of a robot arm of the substrate conveying robot and the substrate holding hand to perform at least one of carrying the substrate out of the storage or carrying the substrate into the storage based on a size of an acquired conveyance gap. The control method for the substrate conveying robot includes a method for teaching the substrate conveying robot using teaching data and/or control parameters.

As described above, the control method for the substrate conveying robot according to the second aspect of the present disclosure includes imaging the plurality of substrates stored in the storage using the imager, acquiring, based on the image captured by the imager, the conveyance gap including at least one of the gap in the storage between the position of the substrate holding hand of the substrate conveying robot and the substrate or the gap in the storage between the substrate being conveyed by the substrate holding hand and the substrate adjacent to the substrate being conveyed by the substrate holding hand, and controlling the operations of the robot arm of the substrate conveying robot and the substrate holding hand to perform at least one of carrying the substrate out of the storage or carrying the substrate into the storage based on the size of the acquired conveyance gap. Accordingly, even when a movement path or position of the substrate holding hand that enters the storage is changed based on the inclination angles or curved states of the substrates, for example, a control can be performed such that the substrate is not carried out of the storage or is not carried into the storage when the size of the conveyance gap is insufficient. Therefore, interference of the substrate holding hand with the substrate arranged adjacent to the substrate to be carried out and interference of the substrate being conveyed by the substrate holding hand with the substrate arranged adjacent thereto can be reduced or prevented. Consequently, it is possible to provide the control method for the substrate conveying robot capable of reducing or preventing substrate interference when the substrate is conveyed.

Furthermore, it is possible to move an optical sensor along an arrangement direction of the substrates stored in the storage to detect the positions of the substrates and to acquire the conveyance gap. On the other hand, in this case, the optical sensor detects only portions of the substrates, such as one ends, and thus it is difficult to accurately acquire the conveyance gap at central portions and other ends of the substrates. Therefore, the conveyance gap is acquired based on the image captured by the imager, as described above, such that the conveyance gap not only at one ends of the substrates but also at the central portions and other ends of the substrates can be acquired. Consequently, it is possible to provide the control method for the substrate conveying robot capable of reducing or preventing interference at the central portions and other ends of the substrates.

According to the present disclosure, it is possible to reduce or prevent substrate interference when the substrate is conveyed.

MODES FOR CARRYING OUT THE INVENTION

An embodiment of the present disclosure embodying the present disclosure is hereinafter described on the basis of the drawings.

The configuration of a substrate conveying robot 100 according to this embodiment is now described with reference to FIGS. 1 to 7.

Figure 1:
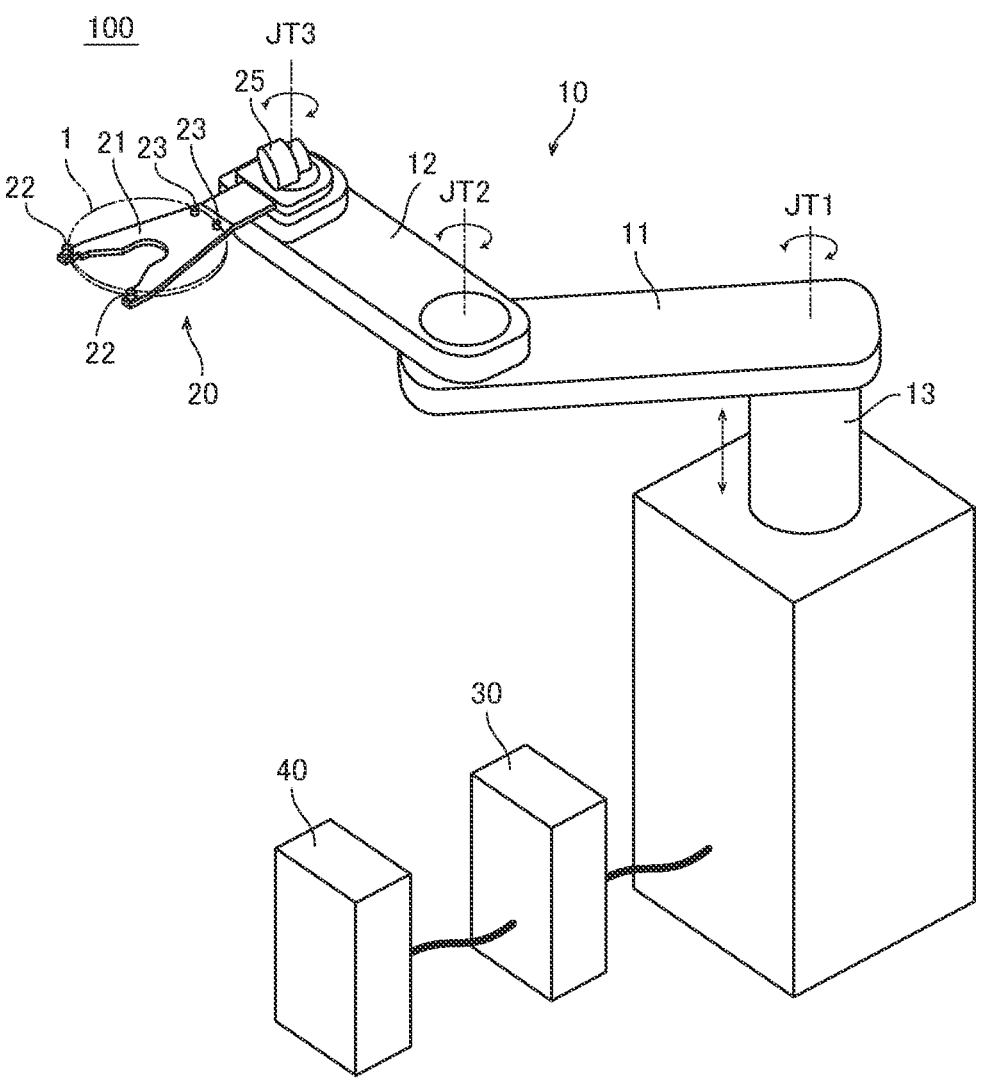
FIG. 1 is a perspective view showing the configuration of a substrate conveying robot according to an embodiment.
Figure 2:
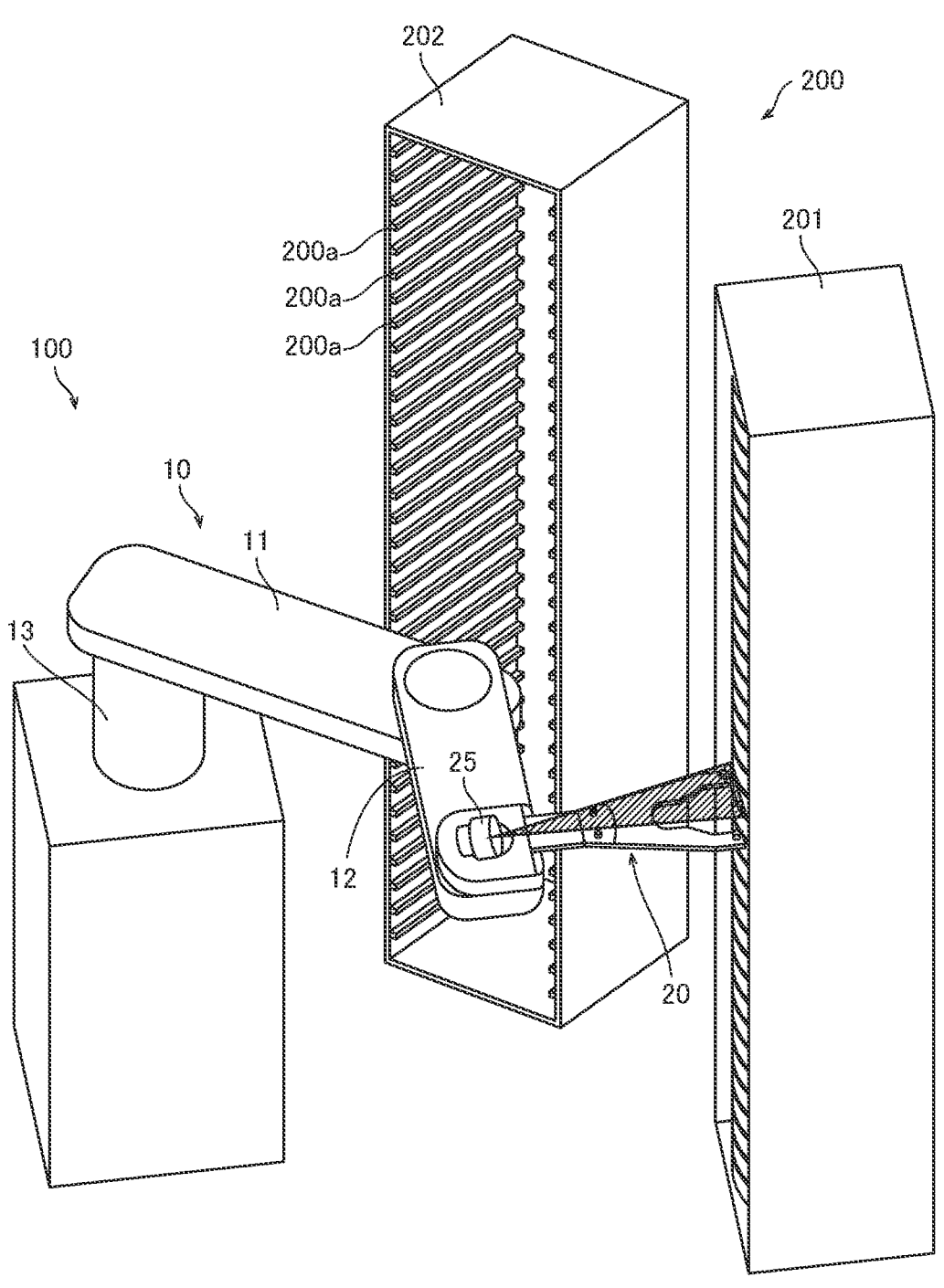
FIG. 2 is a perspective view showing the configuration of the substrate conveying robot and a storage according to the embodiment.

As shown in FIGS. 1 and 2, the substrate conveying robot 100 conveys a substrate 1 such as a semiconductor wafer or a printed circuit board, for example. The substrate conveying robot 100 performs at least one of carrying the substrate 1 out of a storage 200 for storing a plurality of substrates 1 and carrying the substrate 1 into the storage 200.

The substrate conveying robot 100 includes a robot arm 10 and a substrate holding hand 20 that is attached to the tip end of the robot arm 10 and holds the substrate 1. Furthermore, the substrate conveying robot 100 includes a controller 30 that controls the operation of the substrate conveying robot 100.

The robot arm 10 is a horizontal articulated robot arm. The robot arm 10 includes a first robot arm 11 and a second robot arm 12. The first robot arm 11 is rotatable about a lifting shaft 13 described below with a first end of the first robot arm 11 as a rotation center. Specifically, the first end of the first robot arm 11 is rotatably connected to the lifting shaft 13 via a first joint JT1. The second robot arm 12 is rotatable with respect to the first robot arm 11 with a first end of the second robot arm 12 as a rotation center. Specifically, the first end of the second robot arm 12 is rotatably connected to a second end of the first robot arm 11 via a second joint JT2. Furthermore, the substrate holding hand 20 is rotatably connected to a second end of the second robot arm 12 via a third joint JT3. A servomotor that is a drive source for rotary drive, and a rotational position sensor that detects the rotational position of an output shaft of the servomotor are arranged at each of the first joint JT1, the second joint JT2, and the third joint JT3.

The substrate conveying robot 100 includes the lifting shaft 13 that raises and lowers the robot arm 10. A servomotor and a rotational position sensor that detects the rotational position of an output shaft of the servomotor are arranged on the lifting shaft 13.

A blade 21 is provided on the substrate holding hand 20. The blade 21 is a thin support plate that supports the substrate 1. The tip end of the blade 21 has a bifurcated shape. In the blade 21, a pair of supports 22 are arranged at the tip ends of the bifurcated portions, respectively. Moreover, a pair of supports 23 are arranged at the base end of the blade 21. The pair of supports 22 and the pair of supports 23 support the back surface of the outer peripheral edge of the substantially circular substrate 1 from below.

Figure 3:
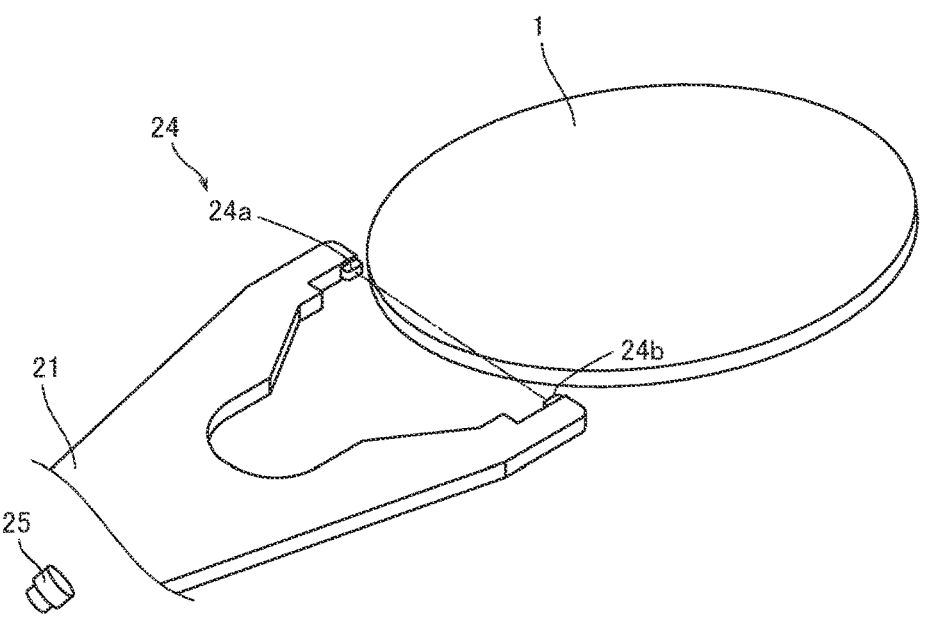
FIG. 3 is a perspective view showing the configuration of a substrate holding hand according to the embodiment.

In this embodiment, as shown in FIG. 3, the substrate conveying robot 100 includes an optical sensor 24 that moves along an arrangement direction in which the plurality of substrates 1 stored in the storage 200 are arranged. The optical sensor 24 is arranged at the tip end of the substrate holding hand 20. Specifically, the optical sensor 24 is arranged at the tip ends of the bifurcated blade 21. The optical sensor 24 is a transmissive center, for example. The optical sensor 24 includes a light projector 24a and a light receiver 24b. The light projector 24a emits detection light toward the light receiver 24b. The detection light is infrared light, for example. As the optical sensor 24, a reflective sensor may be used.

Figure 4:
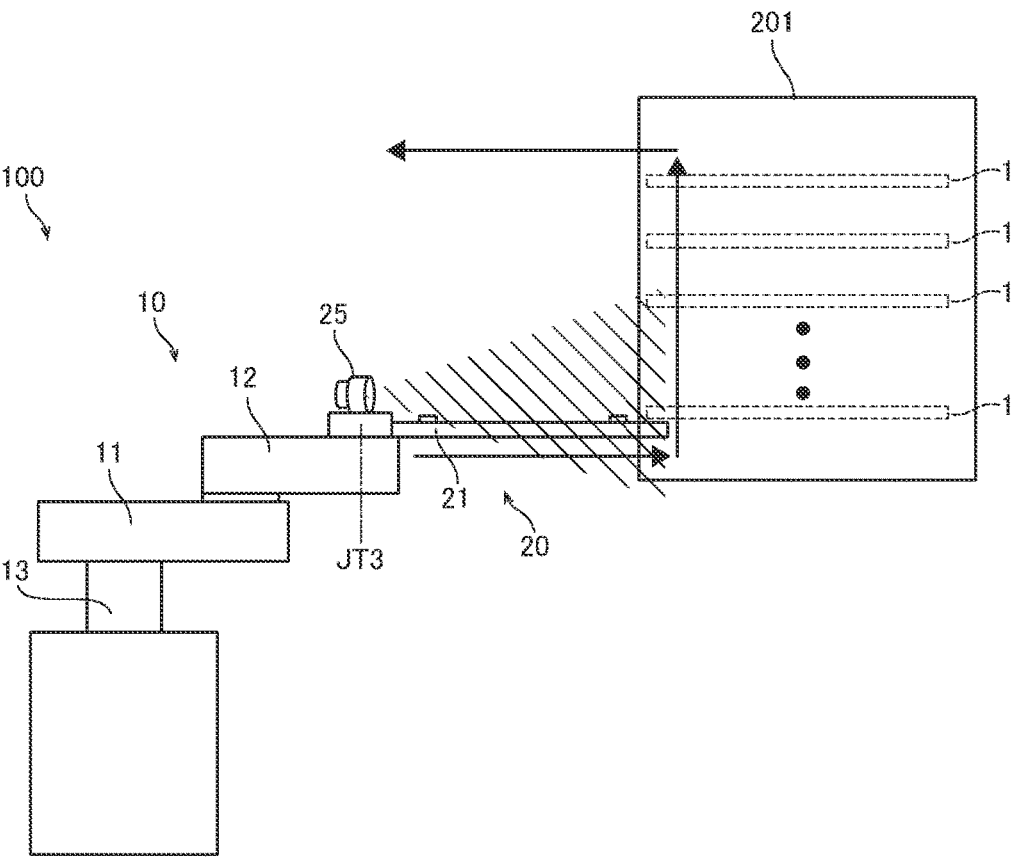
FIG. 4 is a side view showing the configuration of the substrate conveying robot and the storage according to the embodiment.

In this embodiment, as shown in FIG. 4, the optical sensor 24 is moved by the substrate holding hand 20 along the arrangement direction in which the plurality of substrates 1 are arranged. Specifically, the optical sensor 24 is moved along the arrangement direction of the plurality of substrates 1 as the robot arm 10 is raised and lowered by the lifting shaft 13. The arrangement direction is in an upward-downward direction. The robot arm 10 is raised and lowered with the end of the substrate 1 positioned between the bifurcated tip ends of the blade 21. Thus, when the substrate 1 is located between the bifurcated tip ends of the blade 21, the detection light emitted toward the light receiver 24b is blocked. Thus, the presence of the substrate 1 is detected. When the substrate 1 is not located between the bifurcated tip ends of the blade 21, the detection light emitted toward the light receiver 24b is received by the light receiver 24b. Thus, it is detected that the substrate 1 is not present. The detection result of the light receiver 24b is input to the controller 30. The presence or absence of the substrate 1 is determined by the controller 30. In addition to the detection result of the light receiver 24b, the detection result of the rotational position sensor that detects the rotational position of the output shaft of the servomotor of the lifting shaft 13 is input to the controller 30. Thus, the controller 30 associates and acquires the position of the lifting shaft 13 and information on the presence or absence of the substrate 1. That is, the controller 30 acquires the position in a vertical direction in which the substrates 1 are arranged. Furthermore, the controller 30 acquires the shapes of the substrates 1 based on the detection results of the light receiver 24b. The shapes of the substrates 1 are shapes along a horizontal plane or curved shapes, for example.

In this embodiment, as shown in FIG. 4, the substrate conveying robot 100 includes an imager 25 that images the plurality of substrates 1 stored in the storage 200. The imager 25 includes a two-dimensional camera, for example. The imager 25 may include a three-dimensional camera. The imager 25 cannot image all the substrates 1 stored in the storage 200 by one imaging operation. Therefore, in order to image all the substrates 1 stored in the storage 200, it is necessary to perform imaging a plurality of times using the imager 25. The imager 25 images the plurality of substrates 1 stored in the storage 200 from outside the storage 200.

In this embodiment, the imager 25 is arranged on the robot arm 10 or the substrate holding hand 20. Specifically, in this embodiment, the imager 25 is arranged on the base end side of the substrate holding hand 20. That is, the imager 25 rotates as the substrate holding hand 20 rotates about the JT3 axis. The imager 25 is raised and lowered as the robot arm 10 and the substrate holding hand 20 are raised and lowered by the lifting shaft 13.

In this embodiment, the substrate conveying robot 100 includes a notifier 40. The notifier 40 makes a notification by voice or image that the substrate 1 cannot be carried out of the storage 201 described below and that the substrate 1 cannot be carried into the storage 202.

Figure 5:
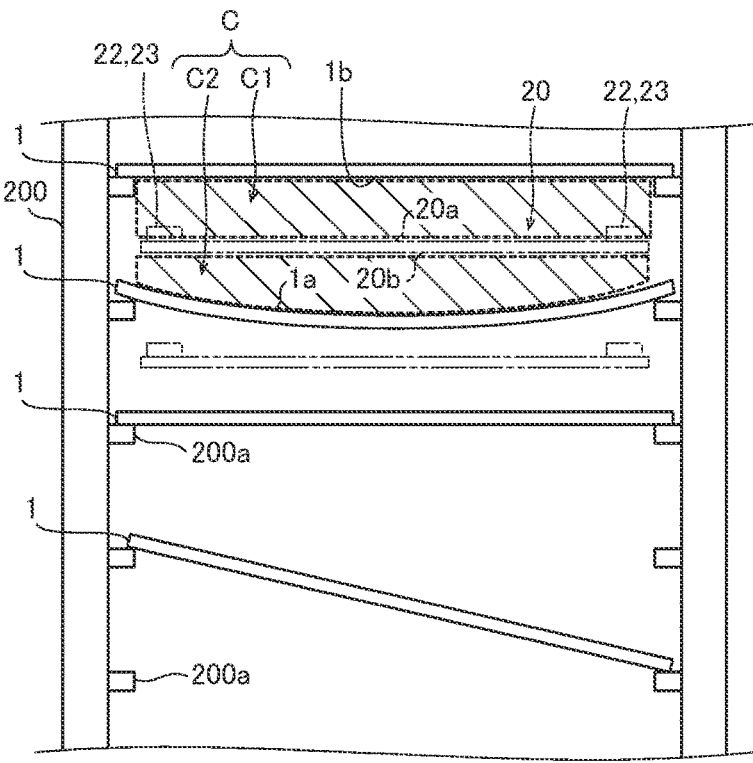
FIG. 5 is a diagram (1) showing a plurality of substrates stored in the storage according to the embodiment.

As shown in FIG. 5, the storage 200 stores the plurality of substrates 1. The plurality of substrates 1 are aligned in the upward-downward direction in the storage 200. The plurality of substrates 1 are spaced apart from each other at predetermined intervals. Protrusions 200a on which the substrates 1 are placed is provided on the inner surfaces of the storage 200. The protrusions 200a protrude along a horizontal direction. The substrates 1 are placed on the protrusions 200a.

As shown in FIG. 2, the storage 200 includes a storage 201 in which the substrates 1 are stored in advance, and a storage 202 into which the substrates 1 carried out of the storage 201 by the substrate conveying robot 100 are carried.

As shown in FIG. 5, the plurality of substrates 1 are arranged in the storage 200. The first and third substrates 1 from the top in FIG. 5 have shapes along the horizontal plane. The second substrate 1 from the top in FIG. 5 has a downward curved shape. The fourth substrate 1 from the top in FIG. 5 is placed on the protrusions 200a having different heights, and is therefore inclined with respect to the horizontal plane.

In this embodiment, the controller 30 acquires a conveyance gap C including at least one of a gap in the storage 200 between the position of the substrate holding hand 20 and the substrate 1, a gap in the storage 200 between the substrate 1 being conveyed by the substrate holding hand 20 and the substrate 1 adjacent to the substrate 1 being conveyed by the substrate holding hand 20, or a gap between the substrates 1 stored in the storage 200 based on the images captured by the imager 25. Then, the controller 30 controls the operations of the robot arm 10 and the substrate holding hand 20 to perform at least one of carrying the substrate 1 out of the storage 201 or carrying the substrate 1 into the storage 202 based on the size of the acquired conveyance gap C. In this embodiment, both carrying-out and carrying-in of the substrate 1 are performed based on the size of the acquired conveyance gap C. Furthermore, in this embodiment, the conveyance gap C includes all of the gap in the storage 200 between the position of the substrate holding hand 20 and the substrate 1, the gap in the storage 200 between the substrate 1 being conveyed by the substrate holding hand 20 and the substrate 1 adjacent to the substrate 1 being conveyed by the substrate holding hand 20, or the gap between the substrates 1 stored in the storage 200.

In this embodiment, the conveyance gap C includes a gap C1 in the storage 200 between the upper surface 20a of the substrate holding hand 20 and the lower surface 1b of the substrate 1 arranged adjacent above the substrate holding hand 20, and a gap C2 in the storage 200 between the lower surface 20b of the substrate holding hand 20 and the upper surface 1a of the substrate 1 arranged adjacent below the substrate holding hand 20. The upper surface 20a of the substrate holding hand 20 includes the upper surface of the blade 21, the upper surfaces of the supports 22, and the upper surfaces of the supports 23. In other words, the upper surface 20a of the substrate holding hand 20 refers to the entire upper area of the substrate holding hand 20. The lower surface 20b of the substrate holding hand 20 includes the lower surface of the blade 21. In other words, the lower surface 20b of the substrate holding hand 20 refers to the entire lower area of the substrate holding hand 20. That is, the conveyance gap C refers to hatched areas in FIG. 5. In other words, the conveyance gap C refers to a gap between the substrate holding hand 20 and the substrate 1 adjacent on the upper side and a gap between the substrate holding hand 20 and the substrate 1 adjacent on the lower side, as viewed in a direction in which the substrate holding hand 20 enters the storage 200.

Figure 6:
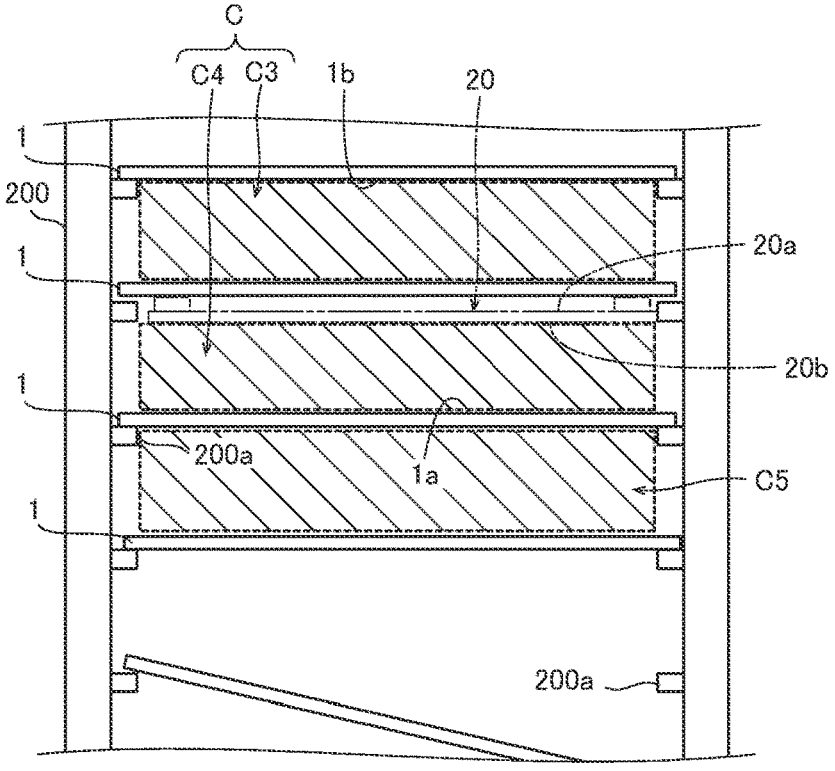
FIG. 6 is a diagram (2) showing a plurality of substrates stored in the storage according to the embodiment.

In this embodiment, as shown in FIG. 6, the conveyance gap C includes a gap C3 between the upper surface 1*a* of the substrate 1 being conveyed by the substrate holding hand 20 and the lower surface 1*b* of the substrate 1 arranged adjacent above the substrate holding hand 20, and a gap C4 between the lower surface 20*b* of the substrate holding hand 20 that is conveying the substrate 1 and the upper surface 1*a* of the substrate 1 arranged adjacent below the substrate holding hand 20. That is, the conveyance gap C includes the first and second hatched areas from the top in FIG. 6.

The conveyance gap C includes a gap C5 between substrates 1 stored in the storage 200. Specifically, the conveyance gap C includes the third hatched area from the top in FIG. 6. Although only one gap C5 is shown in FIG. 6, in reality, the gap C5 is acquired with respect to all the substrates 1 stored in the storage 200.

In this embodiment, the controller 30 acquires at least one of the shapes or positions of the substrates 1 based on the image captured by the imager 25, and acquires the size of the conveyance gap C. Specifically, the controller 30 acquires both the shapes and positions of the substrates 1 by analyzing the image captured by the imager 25. For example, the controller 30 acquires the shapes of the substrates 1 along the horizontal plane or the curved shapes of the substrates 1 based on the image captured by the imager 25. Furthermore, the controller 30 acquires the positions of the substrates 1 based on the image captured by the imager 25.

In this embodiment, the controller 30 corrects, based on the detection results of the optical sensor 24, at least one of the shapes or positions of the substrates 1 acquired based on the image captured by the imager 25. The detection accuracy of the optical sensor 24 is higher than the detection accuracy of the imager 25. Therefore, the controller 30 corrects, based on the detection results of the highly accurate optical sensor 24, at least one of the shapes or positions of the substrates 1 acquired by the imager 25. In this embodiment, both shapes and positions of the substrates 1 are corrected.

In this embodiment, as shown in FIG. 4, the controller 30 controls the imager 25 to image a plurality of substrates 1 at a position at which the substrate 1 is detected by the optical sensor 24. As described above, the optical sensor 24 is moved in the direction in which the plurality of substrates 1 are arranged as the robot arm 10 is raised and lowered by the lifting shaft 13. For example, the optical sensor 24 is raised as the robot arm 10 is raised. When the substrate 1 is located between the bifurcated tip ends of the blade 21, the detection light emitted toward the light receiver 24*b* is blocked by the substrate 1. Thus, the controller 30 causes the imager 25 to capture an image. The controller 30 causes the imager 25 to capture an image every time the substrate 1 is detected or every time a predetermined number of substrates 1 are detected.

In this embodiment, the controller 30 acquires the position of the substrate holding hand 20 in the storage 200 based on the movement path of the substrate holding hand 20 taught in advance to convey the substrate 1. Specifically, the substrate conveying robot 100 is taught in advance a movement path for carrying the substrate 1 out of the storage 201 and a movement path for carrying the substrate 1 into the storage 202. Thus, the controller 30 can acquire the position of the substrate holding hand 20 having been inserted into the storage 201 or the storage 202 based on the movement path taught in advance. The controller 30 also acquires the gaps C1 and C2 based on the position of the substrate holding hand 20 acquired based on the movement path taught in advance and the shapes and positions of the substrates 1 acquired from the image captured by the imager 25 and corrected based on the detection results of the optical sensor 24. Furthermore, the controller 30 acquires the gaps C3 and C4 based on the movement path of the substrate holding hand 20 taught in advance to convey the substrate 1 and the shapes of the substrates 1.

For the storage 201 in which a plurality of substrates 1 are arranged, before the substrates 1 are carried out of the storage 201, the substrates 1 are imaged a plurality of times by the imager 25 while the optical sensor 24 is moved upward once. Thus, the controller 30 acquires the positions and shapes of all the substrates 1 arranged in the storage 201. For the storage 202 into which the substrates 1 are carried, it is assumed that the substrates 1 are arranged on the protrusions 200*a* in odd-numbered stages before the substrates 1 is carried into the storage 202, for example. In this case, while the optical sensor 24 is moved upward once, the substrates 1 placed on the protrusions 200*a* in the odd-numbered stages are imaged a plurality of times by the imager 25. Thus, the controller 30 acquires the positions and shapes of the substrates 1 arranged on the protrusions 200*a* in the odd-numbered stages of the storage 202.

In this embodiment, when the controller 30 determines that the detected conveyance gap C is large enough to convey the substrate 1, the controller 30 controls the operations of the robot arm 10 and the substrate holding hand 20 to perform at least one of carrying the substrate 1 out of the storage 201 or carrying the substrate 1 into the storage 202. In this embodiment, the controller 30 controls the operations of the robot arm 10 and the substrate holding hand 20 to perform both carrying-out and carrying-in of the substrate 1. The controller 30 determines that the detected conveyance gap C is sufficiently large enough such that the substrate holding hand 20 or the substrate 1 held by the substrate holding hand 20 does not interfere with the adjacent substrate 1 when the substrate 1 is carried out of the storage 201 by the substrate holding hand 20. In this case, the controller 30 controls the operations of the robot arm 10 and the substrate holding hand 20 to carry the substrate 1 out of the storage 200. Furthermore, the controller 30 determines that the detected conveyance gap C is sufficiently large enough such that the substrate holding hand 20 or the substrate 1 held by the substrate holding hand 20 does not interfere with the adjacent substrate 1 when the substrate 1 is carried into the storage 202 by the substrate holding hand 20. In this case, the controller 30 controls the operations of the robot arm 10 and the substrate holding hand 20 to carry the substrate 1 into the storage 202.

In this embodiment, when the controller 30 determines that the detected conveyance gap C is not large enough to convey the substrate 1, the controller 30 corrects, based on the size of the detected conveyance gap C, the conveyance path of the substrate 1 taught in advance. For example, the controller 30 determines that the gap C2 with the lower substrate 1 is not large enough to convey the substrate 1 when the downward curved substrate 1 is carried out. In this case, the substrate 1 is curved downward, and thus the substrate holding hand 20 and the substrate 1 interfere with each other when the substrate holding hand 20 enters the storage 201 along the conveyance path taught in advance. Therefore, the controller 30 corrects downward the conveyance path along which the substrate holding hand 20 enters the storage 201. Thus, interference between the substrate holding hand 20 and the substrate 1 is reduced or prevented.

In this embodiment, the controller 30 controls the notifier 40 to make a notification that at least one of carrying-in or carrying-out of the substrate 1 is not possible when the controller 30 determines that at least one of carrying the substrate 1 out of the storage 200 or carrying the substrate 1 into the storage 200 is not possible even when correcting the conveyance path of the substrate 1 taught in advance. In this embodiment, the controller 30 controls the notifier 40 to make a notification both that carrying the substrate 1 out of the storage 201 is not possible and that carrying the substrate 1 into the storage 202 is not possible. The substrate 1 determined to be able to be carried out is carried out. Thus, the gap between the substrates 1 becomes larger, and thus the substrate 1 determined not to be able to be carried out may become able to be carried out. In this case, the substrate 1 once determined not to be able to be carried out is also carried out. Furthermore, among the substrates 1 to be carried into the storage 202, the substrate 1 determined to be able to be carried in is carried in.

Figure 7:
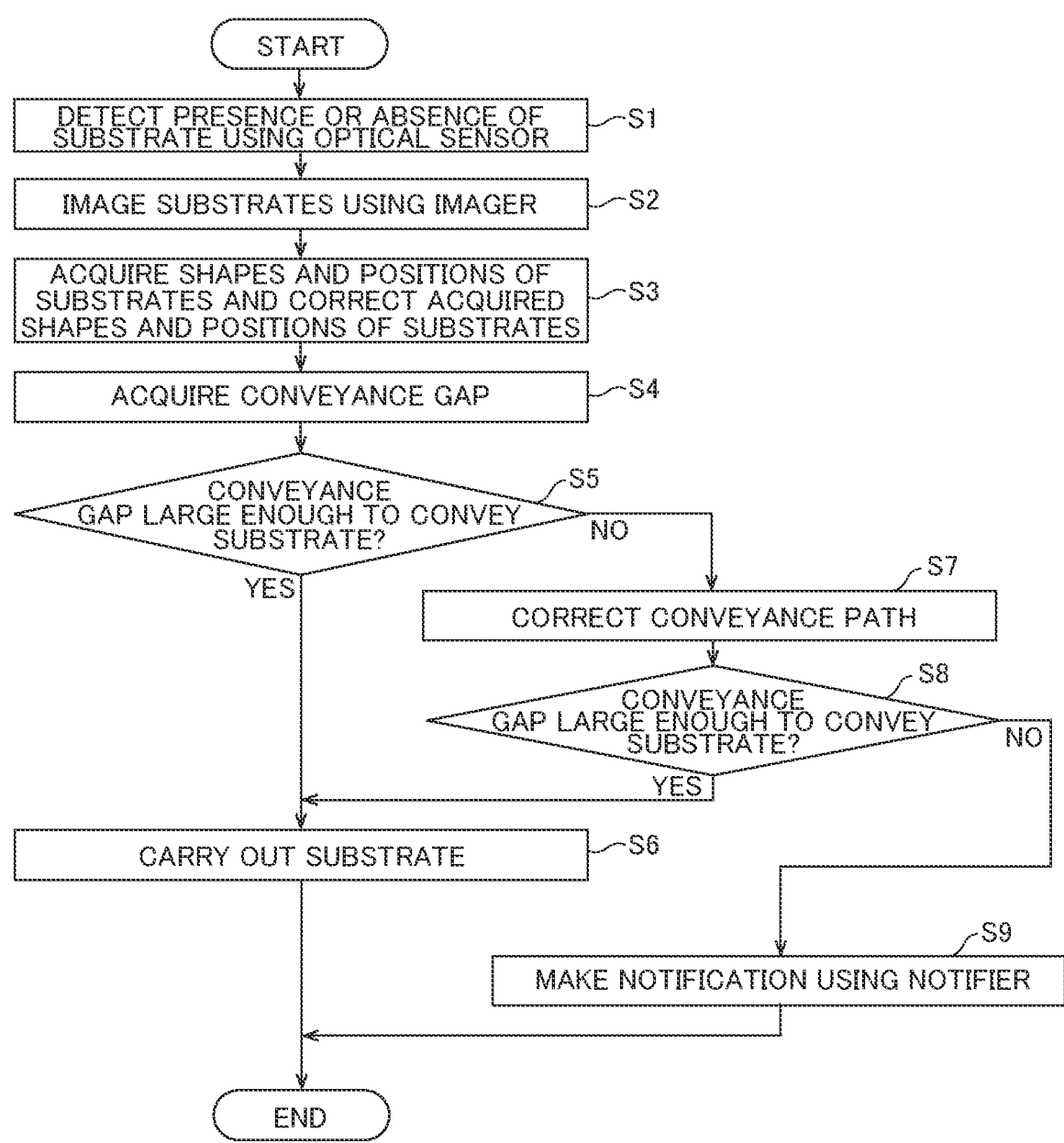
FIG. 7 is a flowchart for illustrating the operation of the substrate holding robot according to the embodiment.

The operation of the substrate conveying robot 100 is now described with reference to FIG. 7. Although the operation of carrying the substrate 1 out of the storage 201 is described below, the operation of carrying the substrate 1 into the storage 202 is performed in a similar manner.

First, in step S1, the controller 30 moves the substrate holding hand 20 to below the substrate 1 stored in the storage 201 by moving the robot arm 10, as shown in FIG. 4. Then, the controller 30 moves the robot arm 10 upward using the lifting shaft 13. Then, the controller 30 detects the presence or absence of the substrate 1 using the optical sensor 24 arranged on the substrate holding hand 20.

In step S2, the controller 30 controls the imager 25 to image a plurality of substrates 1 at a position at which the substrate 1 is detected by the optical sensor 24. After moving the robot arm 10 upward using the lifting shaft 13, the controller 30 moves the substrate holding hand 20 toward the lifting shaft 13.

In step S3, the controller 30 acquires the shapes and positions of the substrates 1 based on the image captured by the imager 25. The controller 30 corrects, based on the detection results of the optical sensor 24, the shapes and positions of the substrates 1 acquired based on the image captured by the imager 25.

In step S4, the controller 30 acquires, based on the image captured by the imager 25, the conveyance gap C including at least one of the gap in the storage 200 between the position of the substrate holding hand 20 and the substrate 1, the gap in the storage 200 between the substrate 1 being conveyed by the substrate holding hand 20 and the substrate 1 adjacent to the substrate 1 being conveyed by the substrate holding hand 20, or the gap between the substrates 1 stored in the storage 200. Specifically, the controller 30 acquires the conveyance gap C based on the shapes and positions of the substrates 1 corrected based on the detection results of the optical sensor 24.

In step S5, the controller 30 determines whether or not the acquired conveyance gap C is large enough to convey the substrate 1.

In a case of yes in step S5, the controller 30 controls the operations of the robot arm 10 and the substrate holding hand 20 to carry the substrate 1 out of the storage 200 in step S6.

In a case of no in step S5, the controller 30 corrects, based on the size of the detected conveyance gap C, the conveyance path of the substrate 1 taught in advance in step S7.

In step S8, the controller 30 determines whether or not the substrate 1 can be carried out of the storage 200 based on the corrected conveyance path.

In a case of yes in step S8, the controller 30 controls the operations of the robot arm 10 and the substrate holding hand 20 to carry the substrate 1 out of the storage 200 in step S6.

In a case of no in step S8, the controller 30 controls the notifier 40 to make a notification that the substrate 1 cannot be carried out of the storage 200 in step S9.

Advantages of this Embodiment

According to this embodiment, the following advantages are achieved.

According to this embodiment, as described above, the controller 30 is configured or programmed to acquire, based on the image captured by the imager 25, the conveyance gap C including at least one of the gap in the storage 200 between the position of the substrate holding hand 20 and the substrate 1, the gap in the storage 200 between the substrate 1 being conveyed by the substrate holding hand 20 and the substrate 1 adjacent to the substrate 1 being conveyed by the substrate holding hand 20, or the gap between the substrates 1 stored in the storage 200, and control the operations of the robot arm 10 and the substrate holding hand 20 to perform at least one of carrying the substrate 1 out of the storage 200 or carrying the substrate 1 into the storage 200 based on the size of the acquired conveyance gap C. Accordingly, even when the movement path or position of the substrate holding hand 20 that enters the storage 200 is changed based on the inclination angles or curved states of the substrates 1, for example, a control can be performed such that the substrate 1 is not carried out of the storage 200 or is not carried into the storage 200 when the size of the conveyance gap C is insufficient. Therefore, interference of the substrate holding hand 20 with the substrate 1 arranged adjacent to the substrate 1 to be carried out and interference of the substrate 1 being conveyed by the substrate holding hand 20 with the substrate 1 arranged adjacent thereto can be reduced or prevented. Consequently, when the substrate 1 is conveyed, substrate 1 interference can be reduced or prevented.

Furthermore, it is possible to move the optical sensor 24 along the arrangement direction of the substrates 1 stored in the storage 200 to detect the positions of the substrates 1 and to acquire the conveyance gap C. On the other hand, in this case, the optical sensor 24 detects only portions of the substrates 1, such as one ends, and thus it is difficult to accurately acquire the conveyance gap C at central portions and other ends of the substrates 1. Therefore, the conveyance gap C is acquired based on the image captured by the imager 25, as described above, such that the conveyance gap C not only at one ends of the substrates 1 but also at the central portions and other ends of the substrates 1 can be acquired. Consequently, when the substrate 1 is conveyed, substrate 1 interference can be appropriately reduced or prevented.

According to this embodiment, as described above, the conveyance gap C includes the gap C1 in the storage 200 between the upper surface 20a of the substrate holding hand 20 and the lower surface 1b of the substrate 1 arranged adjacent above the substrate holding hand 20, and the gap C2 in the storage 200 between the lower surface 20b of the substrate holding hand 20 and the upper surface 1a of the substrate 1 arranged adjacent below the substrate holding hand 20. Accordingly, interference with both the substrate 1 arranged on the upper surface 20a side of the substrate holding hand 20 and the substrate 1 arranged on the lower surface 20b side of the substrate holding hand 20 can be reduced or prevented. Consequently, when the substrate 1 is conveyed, substrate 1 interference can be further reduced or prevented.

According to this embodiment, as described above, the controller 30 is configured or programmed to acquire at least one of the shapes or positions of the substrates 1 based on the image captured by the imager 25, and acquire the size of the conveyance gap C. Accordingly, the conveyance gap C can be acquired in a state in which at least one of the shapes or positions of the substrates 1 are reflected. Consequently, when the substrate 1 is conveyed, substrate 1 interference can be further reduced or prevented.

According to this embodiment, as described above, the controller 30 is configured or programmed to correct, based on the detection results of the optical sensor 24, at least one of the shapes or positions of the substrates 1 acquired based on the image captured by the imager 25. Accordingly, even when at least one of the shapes or positions of the substrates 1 cannot be properly acquired from the image captured by the imager 25, at least one of the shapes or positions of the substrates 1 can be properly acquired based on the detection results of the relatively highly accurate optical sensor 24.

According to this embodiment, as described above, the controller 30 is configured or programmed to control the imager 25 to image a plurality of substrates 1 at the position at which the substrate 1 is detected by the optical sensor 24. Accordingly, even when the number of substrates 1 is relatively large and it is not possible to image all of the substrates 1 by one imaging operation using the imager 25, all of the substrates 1 can be imaged by a plurality of imaging operations.

According to this embodiment, as described above, the imager 25 is arranged on the robot arm 10 or the substrate holding hand 20, and the optical sensor 24 is arranged at the tip ends of the substrate holding hand 20, and is operable to be moved by the substrate holding hand 20 along the arrangement direction in which the plurality of substrates 1 are arranged. Accordingly, the imager 25 can be moved together with the optical sensor 24 as the substrate holding hand 20 is moved.

According to this embodiment, as described above, the controller 30 is configured or programmed to acquire the position of the substrate holding hand 20 in the storage 200 based on the movement path of the substrate holding hand 20 taught in advance to convey the substrate 1. Accordingly, the conveyance gap C can be acquired without actually inserting the substrate holding hand 20 into the storage 200 and imaging both the substrate holding hand 20 and the substrate 1 using the imager 25.

According to this embodiment, as described above, the controller 30 is configured or programmed to control the operations of the robot arm 10 and the substrate holding hand 20 to perform at least one of carrying the substrate 1 out of the storage 200 or carrying the substrate 1 into the storage 200 when the controller 30 determines that the detected conveyance gap C is large enough to convey the substrate 1. Accordingly, the possibility that at least one of carrying-out or carrying-in of the substrate 1 is performed when the size of the conveyance gap C is insufficient to convey the substrate 1 can be reduced or prevented. Consequently, damage to the substrate 1 caused by interference with another substrate 1 or the substrate holding hand 20 can be reduced or prevented.

According to this embodiment, as described above, the controller 30 is configured or programmed to correct, based on the size of the detected conveyance gap C, the conveyance path of the substrate 1 taught in advance when the controller 30 determines that the detected conveyance gap C is not large enough to convey the substrate 1. Accordingly, even when the size of the conveyance gap C is insufficient to convey the substrate 1, the conveyance path of the substrate 1 is corrected such that at least one of carrying-out or carrying-in of the substrate 1 can be performed while interference with another substrate 1 or the substrate holding hand 20 is reduced or prevented.

According to this embodiment, as described above, the controller 30 is configured or programmed to control the notifier 40 to make a notification that at least one of carrying-in or carrying-out of the substrate 1 is not possible when the controller 30 determines that at least one of carrying the substrate 1 out of the storage 200 or carrying the substrate 1 into the storage 200 is not possible even when correcting the conveyance path of the substrate 1 taught in advance. Accordingly, an operator can recognize that at least one of carrying-out or carrying-in of the substrate 1 is not possible.

According to this embodiment, as described above, the conveyance gap C includes the gap between the upper surface 1a of the substrate 1 being conveyed by the substrate holding hand 20 and the lower surface 1b of the substrate 1 arranged adjacent above the substrate holding hand 20, and the gap between the lower surface 20b of the substrate holding hand 20 that is conveying the substrate 1 and the upper surface 1a of the substrate 1 arranged adjacent below the substrate holding hand 20. Accordingly, the conveyance gap C is acquired even while the substrate 1 is being conveyed by the substrate holding hand 20, and thus when the substrate 1 is conveyed, substrate 1 interference can be further reduced or prevented.

Modified Examples

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

For example, while the example in which the controller 30 controls the operations of the robot arm 10 and the substrate holding hand 20 to perform both carrying the substrate 1 out of the storage 201 and carrying the substrate 1 into the storage 202 based on the size of the acquired conveyance gap C has been shown in the aforementioned embodiment, the present disclosure is not limited to this. For example, the controller 30 may control the operations of the robot arm 10 and the substrate holding hand 20 to perform at least one of carrying the substrate 1 out of the storage 201 or carrying the substrate 1 into the storage 202 based on the size of the acquired conveyance gap C.

While the example in which the conveyance gap C includes the gap C1 between the upper surface 20a of the substrate holding hand 20 and the lower surface 1b of the substrate 1, and the gap C2 between the lower surface 20b of the substrate holding hand 20 and the upper surface 1a of the substrate 1 has been shown in the aforementioned embodiment, the present disclosure is not limited to this. For example, when a distance between the substrates 1 arranged in the storage 201 is relatively large, only one of the gap C1 between the upper surface 20a of the substrate holding hand 20 and the lower surface 1b of the substrate 1 and the gap C2 between the lower surface 20*b* of the substrate holding hand 20 and the upper surface 1*a* of the substrate 1 may be considered as the conveyance gap C.

While the example in which the controller 30 acquires both the shapes and positions of the substrates 1 based on the image captured by the imager 25 has been shown in the aforementioned embodiment, the present disclosure is not limited to this. For example, the controller 30 may acquire only one of the shapes and positions of the substrates 1 based on the image captured by the imager 25.

While the example in which the shapes and positions of the substrates 1 acquired based on the image captured by the imager 25 are corrected based on the detection results of the optical sensor 24 has been shown in the aforementioned embodiment, the present disclosure is not limited to this. For example, when the accuracy of the shapes and positions of the substrates 1 acquired based on the image captured by the imager 25 is sufficient to acquire the conveyance gap C, it is not necessary to make a correction based on the detection results of the optical sensor 24.

While the example in which the controller 30 controls the imager 25 to image a plurality of substrates 1 at the position at which the substrate 1 is detected by the optical sensor 24 has been shown in the aforementioned embodiment, the present disclosure is not limited to this. For example, the controller 30 may control the imager 25 to image a plurality of substrates 1 at a predetermined position. Alternatively, when the field of view of the imager 25 is relatively large, the controller 30 may control the imager 25 to image all substrates 1 by one imaging operation.

While the example in which the imager 25 is arranged on the substrate holding hand 20 has been shown in the aforementioned embodiment, the present disclosure is not limited to this. For example, the imager 25 may be arranged on the robot arm 10.

While the example in which the optical sensor 24 is arranged at the tip ends of the substrate holding hand 20 has been shown in the aforementioned embodiment, the present disclosure is not limited to this. For example, the optical sensor 24 may be arranged at portions other than the tip ends of the substrate holding hand 20.

Figure 8:
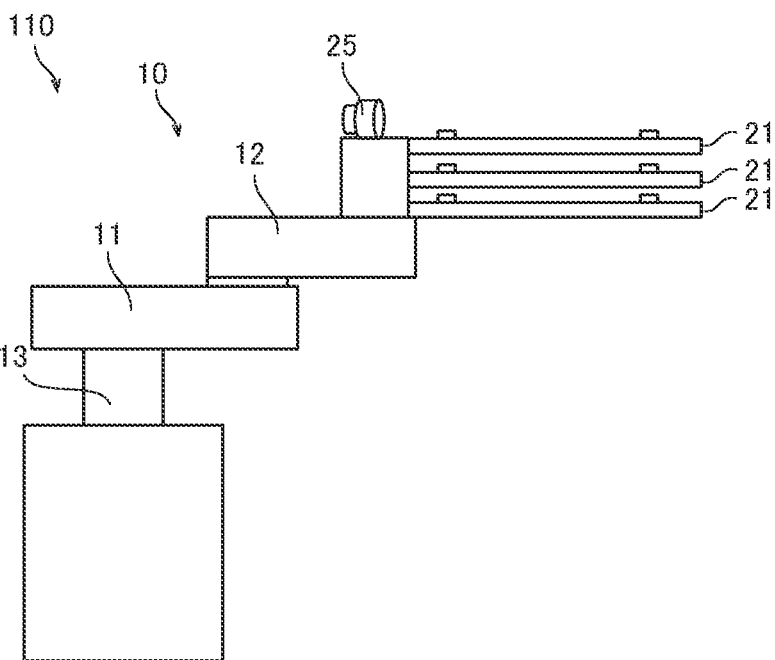
FIG. 8 is a side view showing the configuration of a substrate conveying robot and a storage according to a modified example.

While the example in which one blade 21 is arranged in the substrate conveying robot 100 has been shown in the aforementioned embodiment, the present disclosure is not limited to this. For example, two or more blades 21 may be arranged as in a substrate conveying robot 110 shown in FIG. 8.

While the example in which the conveyance gap C includes all of the gap in the storage 200 between the position of the substrate holding hand 20 and the substrate 1, the gap in the storage 200 between the substrate 1 being conveyed by the substrate holding hand 20 and the substrate 1 adjacent to the substrate 1 being conveyed by the substrate holding hand 20, and the gap between the substrates 1 stored in the storage 200 has been shown in the aforementioned embodiment, the present disclosure is not limited to this. For example, the conveyance gap C may include only one or two of the gap in the storage 200 between the position of the substrate holding hand 20 and the substrate 1, the gap in the storage 200 between the substrate 1 being conveyed by the substrate holding hand 20 and the substrate 1 adjacent to the substrate 1 being conveyed by the substrate holding hand 20, and the gap between the substrates 1 stored in the storage 200.

DESCRIPTION OF REFERENCE NUMERALS

1: substrate
1*a*: upper surface
1*b*: lower surface
10: robot arm
20: substrate holding hand
20*a*: upper surface
20*b*: lower surface
24: optical sensor
25: imager
30: controller
40: notifier
100, 110: substrate conveying robot
200, 201, 202: storage
C: conveyance gap

The invention claimed is:

1. A substrate conveying robot operable to perform at least one of carrying a substrate out of a storage storing a plurality of substrates or carrying the substrate into the storage, the substrate conveying robot comprising:

a robot arm;

a substrate holding hand attached to a tip end of the robot arm to hold the substrate;

an imager to image the plurality of substrates stored in the storage;

an optical sensor operable to move along an arrangement direction in which the plurality of substrates stored in the storage are arranged; and a controller configured or programmed to:

acquire, based on an image captured by the imager, a conveyance gap including at least one of a gap in the storage between a position of the substrate holding hand and the substrate, a gap in the storage between the substrate being conveyed by the substrate holding hand and a substrate adjacent to the substrate being conveyed by the substrate holding hand, or a gap between the substrates stored in the storage;

acquire at least one of shapes or positions of the substrates based on the image captured by the imager, correct, based on detection results of the optical sensor, at least one of the shapes or positions of the substrates acquired based on the image captured by the imager;

acquire a size of the conveyance gap; and control operations of the robot arm and the substrate holding hand to perform at least one of carrying the substrate out of the storage or carrying the substrate into the storage based on the size of the acquired conveyance gap.

2. The substrate conveying robot according to claim 1, wherein the conveyance gap includes:

a gap in the storage between an upper surface of the substrate holding hand and a lower surface of the substrate arranged adjacent above the substrate holding hand; and a gap in the storage between a lower surface of the substrate holding hand and an upper surface of the substrate arranged adjacent below the substrate holding hand.

3. The substrate conveying robot according to claim 1, wherein the controller is configured or programmed to control the imager to image the plurality of substrates at a position at which the substrate is detected by the optical sensor.

4. The substrate conveying robot according to claim 1, wherein the imager is arranged on the robot arm or the substrate holding hand; and the optical sensor is arranged at a tip end of the substrate holding hand, and is operable to be moved by the substrate holding hand along the arrangement direction in which the plurality of substrates are arranged.

5. The substrate conveying robot according to claim 1, wherein the controller is configured or programmed to acquire the position of the substrate holding hand in the storage based on a movement path of the substrate holding hand taught in advance to convey the substrate.

6. The substrate conveying robot according to claim 1, wherein the controller is configured or programmed to control the operations of the robot arm and the substrate holding hand to perform at least one of carrying the substrate out of the storage or carrying the substrate into the storage when the controller determines that a detected conveyance gap is large enough to convey the substrate.

7. The substrate conveying robot according to claim 1, wherein the controller is configured or programmed to correct, based on a size of a detected conveyance gap, a conveyance path of the substrate taught in advance when the controller determines that the detected conveyance gap is not large enough to convey the substrate.

8. The substrate conveying robot according to claim 7, further comprising:

a notifier; wherein the controller is configured or programmed to control the notifier to make a notification that at least one of carrying-in or carrying-out of the substrate is not possible when the controller determines that at least one of carrying the substrate out of the storage or carrying the substrate into the storage is not possible even when correcting the conveyance path of the substrate taught in advance.

9. The substrate conveying robot according to claim 1, wherein the conveyance gap includes:

a gap between an upper surface of the substrate being conveyed by the substrate holding hand and a lower surface of the substrate arranged adjacent above the substrate holding hand; and a gap between a lower surface of the substrate holding hand that is conveying the substrate and an upper surface of the substrate arranged adjacent below the substrate holding hand.

10. A control method for a substrate conveying robot operable to perform at least one of carrying a substrate out of a storage storing a plurality of substrates or carrying the substrate into the storage, the control method comprising:

imaging the plurality of substrates stored in the storage using an imager;

acquiring, based on an image captured by the imager, a conveyance gap including at least one of a gap in the storage between a position of a substrate holding hand of the substrate conveying robot and the substrate, a gap in the storage between the substrate being conveyed by the substrate holding hand and a substrate adjacent to the substrate being conveyed by the substrate holding hand, or a gap between the substrates stored in the storage;

acquiring at least one of shapes or positions of the substrates based on the image captured by the imager;

correcting, based on detection results of an optical sensor, at least one of the shapes or positions of the substrates acquired based on the image captured by the imager;

acquiring a size of the conveyance gap; and controlling operations of a robot arm of the substrate conveying robot and the substrate holding hand to perform at least one of carrying the substrate out of the storage or carrying the substrate into the storage based on the size of the acquired conveyance gap.

11. A substrate conveying robot operable to perform at least one of carrying a substrate out of a storage storing a plurality of substrates or carrying the substrate into the storage, the substrate conveying robot comprising:

a robot arm;

a substrate holding hand attached to a tip end of the robot arm to hold the substrate;

an imager to image the plurality of substrates stored in the storage;

a notifier; and a controller configured or programmed to:

acquire, based on an image captured by the imager, a conveyance gap including at least one of a gap in the storage between a position of the substrate holding hand and the substrate, a gap in the storage between the substrate being conveyed by the substrate holding hand and a substrate adjacent to the substrate being conveyed by the substrate holding hand, or a gap between the substrates stored in the storage;

control operations of the robot arm and the substrate holding hand to perform at least one of carrying the substrate out of the storage or carrying the substrate into the storage based on a size of an acquired conveyance gap; and control the notifier to make a notification that at least one of carrying-in or carrying-out of the substrate is not possible when the controller determines that at least one of carrying the substrate out of the storage or carrying the substrate into the storage is not possible and corrects a conveyance path of the substrate taught in advance.

12. A substrate conveying robot operable to perform at least one of carrying a substrate out of a storage storing a plurality of substrates or carrying the substrate into the storage, the substrate conveying robot comprising:

a robot arm;

a substrate holding hand attached to a tip end of the robot arm to hold the substrate;

an imager to image the plurality of substrates stored in the storage; and a controller configured or programmed to:

acquire, based on an image captured by the imager, a conveyance gap including at least one of a gap in the storage between a position of the substrate holding hand and the substrate, a gap in the storage between the substrate being conveyed by the substrate holding hand and a substrate adjacent to the substrate being conveyed by the substrate holding hand, or a gap between the substrates stored in the storage; and control operations of the robot arm and the substrate holding hand to perform at least one of carrying the substrate out of the storage or carrying the substrate into the storage based on a size of the acquired conveyance gap, wherein the conveyance gap includes:

a gap between an upper surface of the substrate being conveyed by the substrate holding hand and a lower surface of the substrate arranged adjacent above the substrate holding hand; and a gap between a lower surface of the substrate holding hand that is conveying the substrate and an upper surface of the substrate arranged adjacent below the substrate holding hand.

\* \* \* \* \*